June 9, 1931.  C. A. GRONDONA  1,808,773
RECOVERY OF ALKALI METAL COMPOUNDS
Filed Sept. 28, 1927
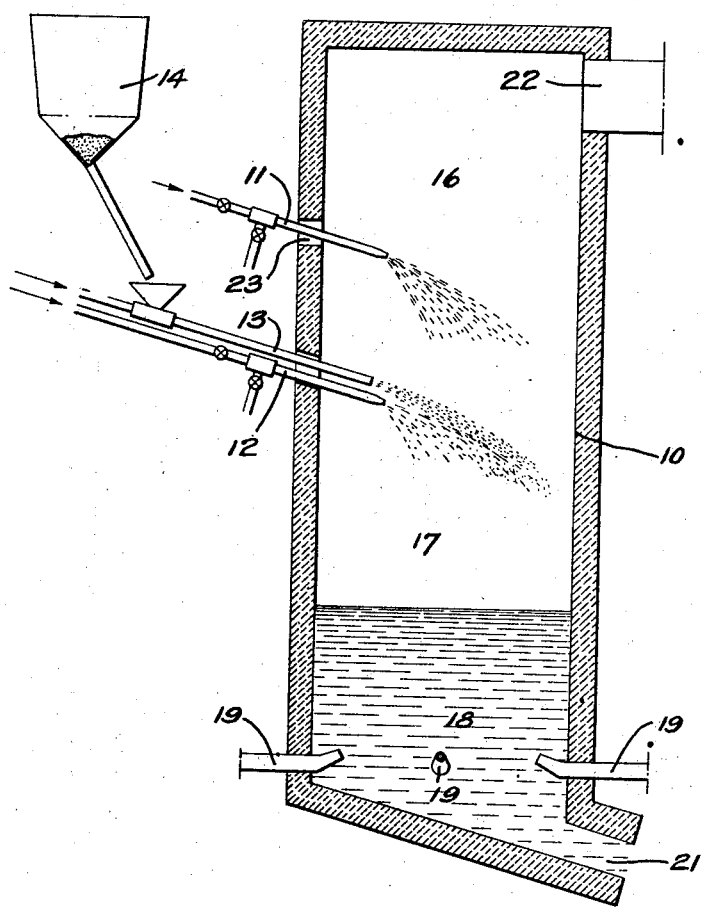
INVENTOR:
Charles A. Grondona
BY
White, Prost & Fryer
ATTORNEYS.

Patented June 9, 1931

1,808,773

UNITED STATES PATENT OFFICE

CHARLES A. GRONDONA, OF SAN FRANCISCO, CALIFORNIA, ASSIGNOR TO PEEBLES PROCESSES INC., OF SAN FRANCISCO, CALIFORNIA, A CORPORATION OF DELAWARE

RECOVERY OF ALKALI METAL COMPOUNDS

Application filed September 28, 1927. Serial No. 222,593.

This invention relates generally to methods and apparatus for effecting recovery of chemicals from liquors and is particularly adapted for the smelting of concentrated black liquor to recover a desired salt of an alkali forming metal therefrom.

In the manufacture of sulphate or "kraft" pulp, a substance commonly known as "black liquor" is obtained which is generally passed thru a concentrating and smelting process for the recovery of valuable chemicals. The smelting process is often carried out in a spray type furnace into which the concentrated black liquor is introduced by suitable spray nozzles, injectors, jets, pelletizers, or other suitable devices. With other types of furnaces, such as the black ash furnace, the black liquor is desiccated to the form of black ash to which is added an amount of sodium sulphate required in operation of the pulp process and the mixture is then shoveled into the furnace in solid form. The smelting operation is carried out by the partial destructive distillation of the organic compounds in the black liquor with the subsequent combustion of the volatile substances formed thereby. The sodium sulphate or sodium bisulphate is then reduced by the carbon of the black liquor to form sodium sulphide, the necessary heat during reduction being furnished by combustion of the carbon and unreduced organic matter.

In the latter type and in furnaces in which the black liquor is introduced in concentrated liquid form in such a manner as to support a zone of combustion above the furnace bed, the furnace must perform three essential functions; first the water must be removed from the liquor by evaporation; second the combustible organic matter (principally lignin) in the black liquor must be burned, and third the sodium sulphate which is introduced into the furnace must react at an elevated temperature with carbon of the lignin to produce sodium sulphide.

In the past with the spray type of furnace it has been the practice to mix the salt cake, or sodium sulphate, with the black liquor either before or while it is sprayed into the furnace. By this method it is attempted to secure an intimate contact between the salt cake and the black liquor, and to uniformly distribute the salt cake in the liquor. In carrying out this process the liquor and salt cake mixture is sprayed into the furnace at substantially the same zone, and if a plurality of sprays are employed, they enter from approximately the same level. A certain amount of reduction of the salt cake probably occurs while the particles are in flight in the furnace, and some further reduction takes place by the action of the salt cake with carbon produced from the organic matter and which falls to the bottom of the furnace. A partial reduction of the sodium sulphate to sodium sulphide thereby takes place and a molten mixture containing principally carbonate, sulphide and sulphate of sodium is discharged. In all processes of this kind which have been utilized in the past there is a substantial percentage of unreduced sodium sulphate, which represents a loss of chemical and thereby renders the process inefficient. The black ash furnace gives as a rule a greater conversion of the sulphate to sulphide, the sulphate present in the smelt being from 4 to 10% while with the spray type, it is difficult to keep it under 16%.

It has been attempted to reduce the percentage of unreduced sulphate by forming a reduction or smelting bed in the bottom of the furnace so as to keep the sodium sulphate in contact with carbon under a reducing condition. A reduction bed of this kind will materially increase the efficiency of such furnaces if it can be successfully maintained under proper condition of temperature and air supply. However in prior processes it has been practically impossible to maintain such a reduction bed for the reason that the introduction of the concentrated black liquor and the air supply have to be controlled primarily for the purpose of maintaining proper combustion, and the conditions which control combustion are inconsistent with the factors which control maintenance of the reduction bed. Thus if in such prior processes the introduction of black liquor is controlled so as to obtain proper combustion, the reduction bed will not be efficiently maintained.

It is an object of this invention to devise a process of smelting black liquor which will reduce the percentage of unconverted sodium sulphate.

It is a further object of this invention to devise a process of operating a smelting furnace whereby a reduction bed may be efficiently maintained at the bottom of the furnace under optimum temperature conditions.

It is a further object of this invention to improve upon the operation of smelting furnaces for black liquor, by rendering the combustion more stable and by carrying out the process with as much economy of heat as possible.

Further objects of this invention will appear from the following description in which I have set forth the preferred embodiment of my invention. It is to be understood that the appended claims are to be accorded a range of equivalents consistent with the state of the prior art.

The single figure of the drawing shows a furnace capable of being utilized with the process of this invention.

By the use of my invention, it is possible to regulate the introduction of black liquor in such a way as not only to secure proper combustion but also to properly maintain the reduction bed. This is made possible by separately maintaining two zones of combustion within the furnace. In the upper part of the furnace part of the black liquor is introduced and the sprays or other devices used are so located, regulated and supplied with air as to result in complete dehydration and substantially complete combustion forming thereby a combustion zone of relatively high temperature. Between this upper zone and the bed of the furnace, I maintain another zone of combustion by the introduction of both the balance of the black liquor and the sodium sulphate at a lower level than the feed for the upper zone. The sprays or other devices used are so located, regulated and supplied with a restricted amount of air that in the lower zone the water is removed from the black liquor by evaporation, but partial combustion only of the material added at this point takes place. Such combustion as takes place in this zone is chiefly of the liberated volatile combustible constituents and such carbon monoxide gas as is formed below. The solid combustible constituents, comprising mainly a spongy carbon which is mixed with alkali residues from black liquor and added salt cake, are not completely consumed. These solids, together with the alkali residues from the combustion in the upper zone form a bed of any desired thickness on the bottom of the furnace in which reducing conditions can be readily maintained and the reduction of sulphate to sulphide thoroughly effected. This reaction and the smelting of the mixture of sodium salts require an elevated temperature, (of the degree of about 1700° to 2000° F.), which is maintained, in part by radiation of heat from the upper zone of the furnace and in part by the oxidation of the carbon in the bed. The relative quantity of concentrated black liquor introduced in the upper and the lower zone must be found by experiment for each particular furnace, the optimum condition being that which gives greatest furnace capacity with efficient reduction of sulphate to sulphide. The exact position of the zones in any furnace will depend on the size and design of the furnace, the extent to which the black liquor has been concentrated, and the capacity of the furnace.

In the drawing I have diagrammatically shown a furnace suitable for carrying out the process of this invention. The inner combustion chamber 10 of the furnace is preferably relatively high compared to its cross sectional area, preferably as much as three or four times as high as its diameter. Concentrated black liquor, containing fifty percent or more solid matter, is introduced into the upper portion of the furnace thru suitable means such as a pneumatic spray nozzle 11. Arranged at a different level with respect to the nozzle 11, there is additional means such as a pneumatic nozzle 12 for spraying additional black liquor into the lower portion of the furnace. The salt cake may be premixed with the black liquor introduced thru nozzle 12, or preferably is separately injected thru a suitable pneumatic nozzle 13, which is adapted to receive powdered salt cake from the hopper 14.

In operating the furnace disclosed, an upper zone of combustion 16 is maintained by the burning of concentrated black liquor introduced thru nozzle 11, and in this zone substantially all of the combustible constituents of the black liquor are consumed. The intense radiant heat thrown downwardly by the zone 16 tends to dehydrate and sustain partial combustion of the black liquor introduced thru nozzle 12, thus forming a lower zone of combustion 17. The non-combustible solid residues from the upper zone 16 fall to the bottom of the furnace thru the lower zone 17, and together with the unconsumed constituents of the black liquor introduced into the zone 17 and with the salt cake form a smelting bed 18 of substantial depth upon the furnace bottom. The temperature of this bed is maintained at a value sufficient to carry out the reaction between the carbon particles and the salt cake, say between the temperatures of 1700 degrees to 2000 deg. Fahrenheit by further combustion of carbon particles by means of air introduced thru tuyères 19, and by means of radiant heat absorbed from the upper combustion zones. The amount of air introduced thru nozzles 12 and 13, and thru the tuyères 19 is so restricted that complete combustion cannot take effect in the zone 17, and so that the carbon in the bed 18 is not consumed until substantially all of the salt cake has been converted thereby maintaining a reducing condition. As a result of the smelting action, a molten mixture consisting chiefly of carbonate, sulphide and sulphate of sodium is discharged from the bottom of the furnace thru the opening 21. Gaseous products of combustion from the furnace may be removed thru opening 22 connected to a stack or other draft means, and air to support combustion in the zone 16 may be introduced thru the opening 23, or by other suitable means.

In one installation which I have completed and successfully operated, the furnace measured 7 feet inside diameter and the combustion chamber was 20 feet in height. The black liquor for the upper combustion zone was introduced about 5 feet from the top of the furnace, and the liquor and sulphate for the lower zone was introduced about 9 feet from the top. A smelting bed of about 5 feet in thickness was maintained upon the furnace bottom. The black liquor employed contained about 70% solids and about two-thirds of the liquor was introduced into the upper zone and about one-third into the lower zone. The combustion was exceedingly stable and the percentage of unconverted sulphate ranged from 8 to 12%. In prior smelting furnaces using simple spray injection of black liquor, the unconverted sodium sulphate ranges from 14 to 18%.

I claim:

1. In a method of recovery of a salt of an alkali forming metal from black liquor, the step comprising maintaining a high temperature zone of combustion in the furnace by the introduction of black liquor, and introducing additional black liquor and salt cake into the furnace between said zone and the lower portion of the furnace.

2. In a method of recovery of a salt of an alkali forming metal from black liquor, the step comprising maintaining a zone of combustion in the upper part of the furnace, the zone being independently maintained with respect to the lower portion of the furnace, and maintaining a reduction bed in the lower portion of the furnace by spraying black liquor and salt cake into the furnace between the bed and the upper independently maintained zone of combustion.

3. In a method of recovery of a salt of an alkali forming metal from black liquor, the steps comprising injecting black liquor into an upper part of the furnace, and maintaining a reduction bed in the lower portion of the furnace by spraying black liquor and salt cake into the furnace between the furnace bed and an upper zone of combustion maintained by the separate injection of the black liquor into the upper part of the furnace.

4. In a method of recovery of a salt of an alkali forming metal from black liquor having combustible constituents, the step comprising separately maintaining two combustion zones above the furnace bed by spraying said liquor into the furnace, the upper zone being of high temperature and effecting substantially complete combustion of said combustible constituents, the lower zone being of lower temperature and effecting partial combustion of said constituents whereby a reducing zone is maintained.

5. In a method of recovery of a salt of an alkali forming metal from liquor having combustible constituents, the steps comprising separately maintaining two combustion zones above the furnace bed by the introduction of said liquor, the upper zone being of high temperature and effecting substantially complete combustion of said constituents, the lower zone being of lower temperature and effecting a partial combustion of such constituents whereby a reducing zone for formation of the desired alkali forming salt is maintained, and spraying a reducible salt into said lower zone whereby the said reducible salt is reduced to the desired alkali forming salt.

In testimony whereof, I have hereunto set my hand.

CHARLES A. GRONDONA.